Patented May 19, 1936

2,041,560

UNITED STATES PATENT OFFICE 2,041,560

WATER SOLUBLE SULPHONATED CONDENSATION PRODUCTS

Ernst Alfred Mauersberger, Maarssen, near Utrecht, Netherlands

No Drawing. Application March 14, 1935, Serial No. 11,046. In Germany September 20, 1934

6 Claims. (Cl. 260—99.12)

My invention relates to certain new water-soluble preparations made from woolfat alcohols and particularly from the cholesterin bodies thereof and their derivatives, and to the process of producing such preparations.

Woolfat alcohols and the cholesterin bodies preponderatingly present therein are cheap and very readily accessible, but they have heretofore not been used practically because the reaction products of these bodies were found to be highly unstable. Attempts were made to use such reaction products in the textile industry, but because of the instability of the products these attempts resulted in failure.

The cholesterin bodies which make up the bulk of woolfat alcohols of various origins are isocholesterin, oxycholesterin, metacholesterin, cholesterin and others, and while these bodies are partly emulsified with water, nevertheless the emulsions are very tough and quickly give off their water, leaving a hard, tough, porous body which practically contains no water.

By sulphonating the cholesterin bodies under very careful operating conditions in a strongly acid medium, soluble products were obtained which, however, decompose as soon as diluted with water, so that the product really obtained was a solution of the cholesterin body in the sulphonating medium. If a powerful sulphonating medium, such as chlorsulphonic acid, be used, only pure black, tar-like, insoluble decomposition products are obtained. These results are due primarily to the hydroxyl group which is secondarily attached in the cholesterin bodies.

Mixed sulphonation of woolfat alcohols or of the cholesterin bodies produced therefrom, with such well-known fatty alcohols as lauric alcohol, cetyl alcohol or oleic alcohol and the like gave no satisfactory results as only about 15% of the cholesterin bodies could be used if soluble products were to be obtained at all. Upon using more than 15% of the cholesterin bodies, the latter separated out in the aqueous solution of the sulphonate and, as a matter of fact, in this sulphonating procedure the woolfat alcohol and its cholesterin bodies did not enter into the reaction but were merely carried along as ballast bodies which were emulsified by the fatty alcohol sulphonate which formed.

The principal object of my invention is to produce new clearly water soluble highly useful condensation products from woolfat alcohols and particularly from the cholesterin bodies thereof and their derivatives, and I accomplish this object by first esterifying the cholesterin bodies (which are secondary alcohols) with boric acid and subjecting the cholesterin boric acid esters or borate to treatment with a sulphonating medium in the presence of a boric acid ester or borate of an aliphatic alcohol. In this procedure it is desirable to use molecular equivalent quantities of cholesterin borate and fatty alcohol borate.

It may be pointed out that for the purpose of my invention it is not necessary to first separate the cholesterin bodies out of the woolfat alcohols if the latter consist preponderatingly of cholesterin. In this case the woolfat alcohols may be used directly as such after previous esterification with boric acid.

In carrying out my process two parallel reactions occur. The aliphatic chain of the fatty alcohol borate is condensed with a satisfactory yield at the cholesterin bodies, the condensation probably occurring in the cyclic body of the cholesterin molecule. At the same time sulphonation of the enlarged cholesterin molecule takes place. Very little can as yet be said with certainty regarding the course of the reaction, but in any event all the cholesterin bodies undoubtedly participate in the reaction.

The resulting acid reaction products may be neutralized in the manner well known in this art by any of the alkaline reacting agents, such a caustic soda or potash solution, ammonia as gas or in solution, amides, pyridine, etc.

The new substances obtained in accordance with my invention dissolve very easily and clearly in water with a weakly yellow color. When in dehydrated condition they appear as a light hygroscopic light yellow powder which can be very easily balled together. By treating the paste with about 1% of a 30% hydrogen peroxide solution, and permitting the entire mass to stand for two days, the color tone may be materially bleached.

For the purpose of producing the new substance I may start with the cholesterin bodies of woolfat alcohols, such bodies being previously freed of aliphatic constituents and the alcohol being separated by fractionation. I may also alternatively, start with the whole alcohol of the woolfat, particularly if the alcohol consists preponderatingly of cholesterin bodies. These alcohols are first esterified with boric acid. The borates of the fatty alcohols which cooperate in the condensing action are produced from saturated or unsaturated aliphatic primary alcohol. The sulphonating and condensing medium required for the reaction may consist of about a 90% sulphuric acid or of higher concentration or may en have anhydride added thereto. The reaction temperature may vary between 20 to 70° C., dependent on the strength of the sulphonating medium. To obtain final products as light in color as possible, it is desirable not to exceed a temperature of about 50° C.

The final products of my invention are excellent wetting, washing, emulsifying and, more especially, softening media, which are applicable in the textile, leather and cosmetic industries, in the household, for improvement of high grade soaps and the like. By reason of their pronounced softening action they may be used to improve the alkylated aromatic sulphonic acids, inasmuch as they favorably affect the latter, and their emulsions with fats, oils, waxes and the like are usuable for clearing or brightening purposes.

The following examples will serve to illustrate invention.

Example 1

Woolfat alcohols obtained by saponifying and distilling the extraction of Breadford woolfat, are subjected to fractional distillation of high vacuum and the fraction distilling over about 230° C. at a vacuum of 3 mm. is caught up. This fraction contains the cholesterin bodies and amounts 50 to 60% of the entire alcohol. 50 parts of this cholesterin fraction are esterified in vacuo with 4 parts of commercial boric acid, the ester thereupon cooled to 60° C. and mixed and thoroughly stirred with 40 parts of orthoboric acid ester of oleic alcohol. The mixture is cooled down to 20° C. resulting in the production of a viscid, yellow, clear oil. While stirring and cooling, 50 parts of a 95% sulphuric acid are slowly introduced into the oil, the temperature being maintained at about 35° C. As soon as all the sulphuric acid has been introduced, a stirring is continued for about an hour and the mixture is cooled down to 25° C. The acid sulphonation and condensation product is now introduced into parts of cold water, further cooling being effected. The product dissolves in the water very quickly. Thereupon the diluted product is neutralized with a 40% caustic soda solution at temperatures between 20 and 25° C. The final product is a light yellow paste which may be sprayed in an appropriate apparatus to form a light yellow, lightweight, hygroscopic powder which can easily balled together.

Example 2

German woolfat yields woolfat alcohols which consist of about 70% of cholesterin bodies and of aliphatic high molecular, saturated and unsaturated wax alcohols. These woolfat alcohols are esterified in vacuo with about 8% of commercial boric acid and 50 parts of the resulting boric acid ester are mixed with 40 parts of cetyl borate. The mixture is cooled to about 30° C., at a temperature not exceeding 35° C. 45 parts of commercial sulphuric acid are stirred into the mixture. Thorough stirring of the entire mixture is continued for about one hour and one-half and this acid product is then introduced into 90 parts of water at a temperature not in excess of 25° C. Neutralization is then effected with a 40% caustic soda solution at a temperature between 20 and 25° C. and the product may be converted into powder form, as in Example 1.

Example 3

The cholesterin fractions recovered from woolfat alcohols as described in Example 1 are esterified with 8% of boric acid, 50 parts of this ester are mixed with 50 parts of orthoboric acid ester of fatty alcohols obtained from sperm oil. 50 parts of concentrated sulphuric acid are stirred into this mixture at about 25° C. The reaction product is thereupon introduced into 100 parts of water at a temperature not exceeding 25° C. and is neutralized at the same temperature with a 40% caustic soda solution. The resulting yellow paste may be converted into powder form by spraying, and by treating the paste with about 1% of a 30% hydrogen peroxide solution the color tone may be materially improved.

I claim:

1. As a new composition of matter, the sulphuric acid ester of the condensation product of a boric acid ester of an aliphatic alcohol with a boric acid ester of a cholesterin body, said aliphatic alcohol containing at least ten carbon atoms in the molecule.

2. The herein described process of producing sulphonated condensation products which process comprises forming a boric acid ester of a substance selected from the class of woolfat alcohols consisting mainly of cholesterol bodies, condensing said esters in the presence of a sulphonating agent with a boric acid ester of an aliphatic alcohol containing at least ten carbon atoms in the molecule and neutralizing the resulting products.

3. The herein described process of producing sulphonated condensation bodies, which process comprises forming a boric acid ester of cholesterin bodies of woolfat alcohols, condensing said esters in the presence of a sulphonating agent with a boric acid ester of an aliphatic alcohol containing at least ten carbon atoms in the molecule and neutralizing said products.

4. The herein described process of producing sulphonated condensation products, which process comprises the steps of claim 2 and the additional step of bleaching the neutralized product.

5. As a new composition of matter, the neutralized reaction product of condensing a boric acid ester of a woolfat alcohol with the boric acid ester of oleic alcohol in the presence of a sulphonating agent.

6. As a new composition of matter, the neutralized reaction product of condensing a boric acid ester of a cholesterol body of woolfat alcohols with the boric acid ester of cetyl alcohol in the presence of a sulphonating agent.

ERNST ALFRED MAUERSBERGER.